July 28, 1953  H. C. KNARZER  2,646,591
THREE-PIECE TUBULAR LAWN MOWER HANDLE
AND METHOD OF MANUFACTURING SAME Filed Feb. 8, 1951   2 Sheets-Sheet 2

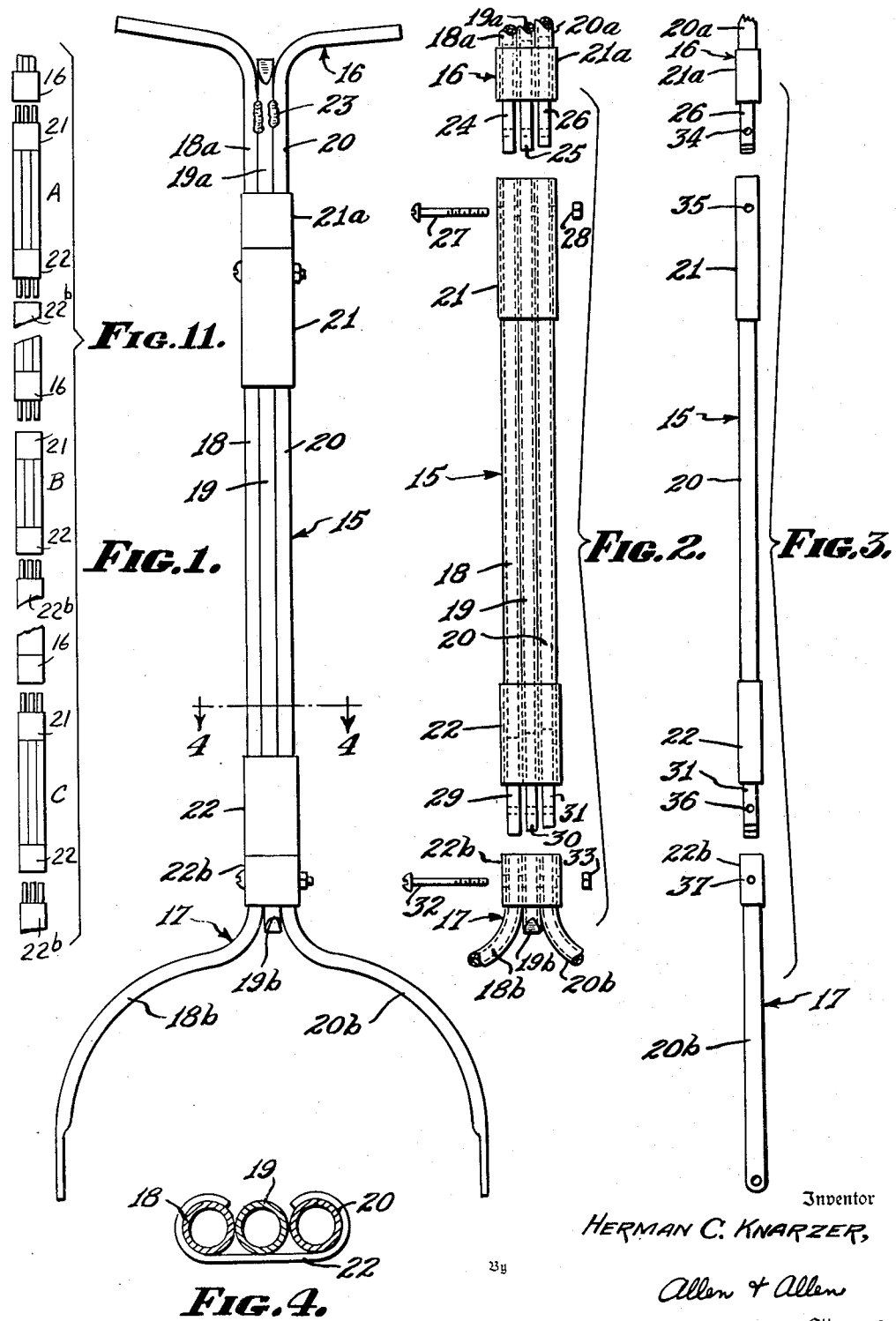

Inventor
HERMAN C. KNARZER,
By
Allen & Allen
Attorneys.

Patented July 28, 1953

2,646,591

UNITED STATES PATENT OFFICE 2,646,591

THREE-PIECE TUBULAR LAWN MOWER HANDLE AND METHOD OF MANUFACTURING SAME

Herman C. Knarzer, Richmond, Ind., assignor to Dille & McGuire Mfg. Co., Richmond, Ind., a corporation of Indiana Application February 8, 1951, Serial No. 209,950

14 Claims. (Cl. 16—111)

1

My invention relates to improved lawn mower handles, especially of the tubular type, and more particularly to a handle that is formed in three basic sections which can be assembled easily. My invention also relates to a method of manufacturing a handle of this type.

Heretofore it has commonly been the practice, in the lawn mower industry, for the manufacturer to pack the wheel and blade assembly in individual cartons and to pack a plurality of lawn mower handles in bundles which are separate from the package containing the wheel and blade assembly. Usually a manufacturer will produce several different sizes of lawn mowers, and these, of course, require handles of different sizes also. Ordinarily the manufacturer will ship a number of the packaged wheel and blade assemblies to various warehouses along with the required number of bundles of lawn mower handles.

This practice of packing and shipping the lawn mower handles separately from the wheel and blade assembly, produces needless confusion and expense. When the warehouseman receives an order from a retailer who desires a certain number of each of the various lawn mowers, he must first go through the packages containing the wheel and blade assemblies until he finds the required number of the specified sizes. It is then necessary for the warehouseman to break open various bundles of lawn mower handles until he finds enough handles of the proper size for the various wheel and blade assemblies ordered. The warehouseman will then gather together the packages and the individual handles and send them out to the retailer. Not only is this procedure clumsy, but also it is quite easy for lawn mower handles of the wrong size to be sent to the retailer. Not only is it quite possible that the warehouseman or his delivery boy will make a mistake as to which handles are sent to which of the various retailers, but also it is possible that the manufacturer will not send the correct handles with the packages of wheel and blade assemblies. And, of course, there is always the possibility that the wheel and blade assemblies may become separated from the bundles of handles that were to accompany them during transit.

Attempts have been made to solve the various problems above outlined, and one of these attempts was that of making the lawn mower handle in a plurality of sections so that it could be packed in the same carton as the wheel and blade assembly for which it was designed to be used.

Such attempts in the past, however, have resulted in lawn mower handles of relatively poor quality and lacking the necessary strength and

2 rigidity for equipment of this type. Also, such handles have been difficult and expensive to manufacture. Accordingly, it is a primary object of my invention to provide a lawn mower handle made of a plurality of sections but having extraordinary rigidity and strength when assembled.

Another important object of my invention is to provide a lawn mower handle of the type described which can easily and quickly be assembled by the ultimate user even though he has little or no mechanical skill.

Yet another important object of my invention is to provide a method of manufacturing a handle of the type described which is both efficient and economical.

A further object of my invention is to provide a method for manufacturing lawn mower handles of this type in which method any chance that various sections of different lawn mower handles will become mixed together so that the handles are difficult or impossible to assemble properly is virtually eliminated.

It is also an object of my invention to provide a lawn mower handle comprised of a plurality of sections but having a minimum number of parts so that there is little chance of a user receiving an incomplete or bulky lawn mower handle assembly.

It is also an object of my invention to provide a method for producing a lawn mower handle of the type described which will insure that the various sections of each lawn mower handle fit together neatly and properly thereby assuring the provision not only of a sturdy handle, but also one which is free of unsightly blemishes.

These and other objects and advantages of my invention will become apparent to one skilled in the art during the course of the following description, and from reference to the accompanying drawings in which drawings like numerals are employed to designate like parts throughout the same and in which:

Figure 1 is a front view of an assembled lawn mower handle embodying the features of my invention and made according to the teachings set forth herein.

Figure 2 is a partial and exploded view of my lawn mower handle.

Figure 3 is a side elevation of a portion of my handle in partially exploded condition.

Figure 4 is a sectional view taken on the line 4—4 of Figure 1.

Figure 5:
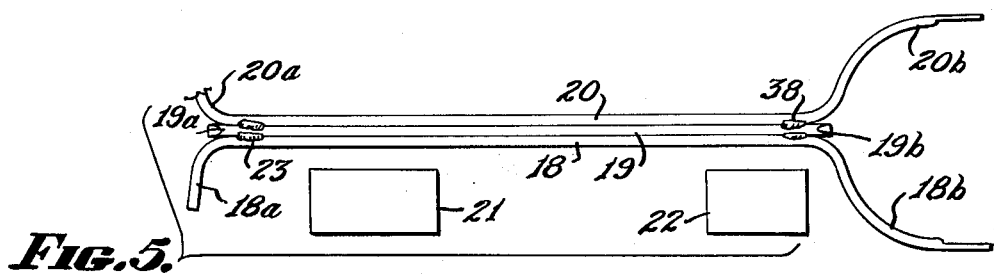
Figure 6:
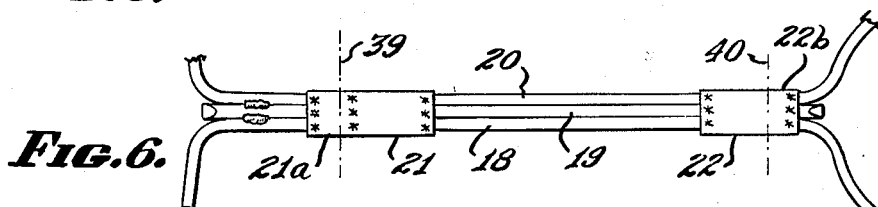

Figures 5 through 10 diagrammatically represent my novel method for constructing a handle of the type shown in Figure 1.

Figure 11 shows a series of partial and exploded views of various modifications of my invention.

Referring first to Figures 1 through 4, I shall describe my novel lawn mower handle. The lawn mower handle of my invention is comprised of three main sections, namely, the body or shank generally indicated at 15, the cross bar or handle generally indicated at 16, and the portion proper generally indicated at forked or pronged section generally indicated at 17. The body or shank portion is made up of three tubes 18, 19, and 20 bound together by a pair of sleeves 21 and 22. These sleeves are preferably welded to the tubes, but may be fastened thereto in any other suitable manner. The tube-sleeve structure 18—21 presents an extremely rigid and sturdy lawn mower handle shank portion.

The cross bar section 16 is formed of three tubes indicated at 18a, 19a, and 20a bound together by a sleeve 21a. As will be discussed in greater detail in connection with the description of my novel method for constructing a handle of this type, it is preferred that the tubes of which the cross bar section is formed are extensions of the tubes of which the shank portion is formed. The tubes 18a, 19a, and 20a may be welded together as indicated at 23 and the sleeve 21a may also be welded to these tubes. The cross bar section 16 thus formed is also extremely rigid and sturdy.

The forked or pronged section generally indicated at 17 is formed of three tubes 18b, 19b and 20b bound together by a sleeve 22b. As is also discussed in the description of my novel method for making a handle of this type, it is preferred that the tubes making up the section 17 be extensions of those tubes employed in the construction of the shank portion 15. It is preferred that the sleeve 22b be welded to the various tubes but other suitable and equivalent means may be used if desired. The section 17 is also of rigid and sturdy construction.

The various sections 15, 16, and 17 may be assembled and fastened together as follows:

Three rods each of a size to fit just nicely within the ends of tubes 18a, 19a, and 20a, respectively, are fixed in these tubes. These rods are indicated at 24, 25, and 26. As is shown in dotted lines in Figure 2, a hole is provided near the outer ends of each of these rods. As is also shown in this figure, these rods are so arranged that the outer ends are staggered with respect to one another. A hole is also provided in the sleeve 21 and tubes 18, 19 and 20. This hole is so positioned that when the rods 24, 25, and 26 are positioned within the ends of the tubes 18, 19 and 20, and the sleeve 21a brought flush against the sleeve 21, the holes provided in the ends of the rods will conform exactly with it. A bolt 27 may then be passed through the sleeve 21, the rods 24, 25 and 26, and the tubes 18, 19, and 20. This bolt may be maintained in position by means of a nut 28. Similarly, the fork or pronged section 17 may be fastened to the shank 15 as follows:

Rods 29, 30 and 31 are fixed in the ends of the tubes 18, 19, and 20, respectively. Each of these rods is also provided with a hole located near its outer end and these rods are also so positioned that these outer ends are staggered with respect to one another. A hole is provided through the sleeve 22b and the tubes 18b, 19b, and 20b. When the section 17 is so positioned with respect to the section 15 that the sleeve 22b is flush against the sleeve 22, a bolt 32 may be passed through the sleeve 22b, tubes 18b, 19b, and 20b, and the rods 29, 30 and 31. This bolt may be secured by means of a nut 33. The various holes above referred to are indicated at 34, 35, 36 and 37 in Figure 3.

Although I have shown the rods 24, 25, and 26 fixed in the section 16 and the rods 29, 30 and 31 fixed in the section 15, it should be understood that one group of these rods could be fixed in the section 15 and the other group in the section 17. In any event, however, I prefer that one group of the rods be fixed in the central or shank section 15 and the other group of rods in either the section 16 or the section 17. This arrangement is preferred for the reason that it eliminates any confusion as to which end of the section 15 the sections 16 and 17 are to be fixed. In this manner, positive assurance is provided that the various holes will be properly aligned.

Although I prefer the arrangement just described, it is possible for all the rods to be fixed in the section 15. And, of course, it is also possible that one group of the rods be fixed in the section 16 and the other group in the section 17. The reason that I do not prefer these latter two arrangements is that such arrangements make it possible for one to endeavor to fasten the section 17, for example, to that end of the shank 15 which is best adapted to receive the section 16. In this event, it is possible that the various holes will not be properly aligned and it may become difficult to insert the bolts 27 and 32. Although these latter constructions are not preferred, it is to be understood that they are included in the scope of my invention.

It will also be observed that I have indicated that the ends of each of the rods within a group are staggered with respect to one another. The reason for this construction is that it makes it easier to assemble one section with another. This is true because it is necessary only to start or position one rod at the time with respect to the tubes comprising the section 15, for example, rather than to align all the rods and tubes simultaneously. Again, however, it should be understood that it is not absolutely necessary to so stagger these rods, or to stagger them in this particular manner and that while I prefer the construction shown, these other constructions are also within the scope of my invention and (see also Figure 7) the various rods may be of the same length but inserted to various depths within the ends of the respective tubes or these rods may themselves be of varying lengths and inserted equal depths within the respective tubes. All such modifications are intended to be included within the scope of my invention.

It is contemplated that a lawn mower handle built according to my invention will be shipped within the same carton as the wheel and blade assembly with which it is designed to be used. One way of so packing and shipping a handle of this type is to place the central section 15 alongside the wheel and blade assembly, perhaps diagonally of the carton itself and to place the sections 16 and 17 on a pad already provided in the carton just above the wheel and blade assembly. The two bolts and their nuts may be secured in any of the sections for purposes of packaging or may be placed in a paper or cloth bag and attached to the handle or just placed in the carton. In addition to all of the advantages above indicated as flowing from that arrangement wherein a tubular lawn mower handle may be packaged directly with the wheel and blade assembly for which it is designed, I have provided a tubular lawn mower handle which is extremely simple to assemble and which, when assembled, is even sturdier than the conventional handles heretofore developed.

A handle built according to my invention and packaged as above indicated could be maintained in that package until the lawn mower reaches the ultimate user. Such user would have only to remove the three sections, take out the bolts, place the sections together as above described, and then insert the bolts and tighten the nuts. Having done this, he will have a completely assembled lawn mower handle of neat and rugged construction, and this he obtained by merely inserting two bolts and securing nuts thereto.

In Figures 5 through 10, I have diagrammatically illustrated that method which I prefer to employ in the construction of a lawn mower handle of the type just described. Three properly formed tubes of desired length are obtained and placed on a supporting surface in side by side relation to one another, as indicated in Figure 5. These tubes may be the tubes 18, 19 and 20 referred to above. It will be observed that the tubes 18 and 20 are bent so as to form the prongs 18b and 20b, respectively, and the cross bars 18a and 20a respectively. The tube 19 is of sufficient length to form the sections 19a and 19b also. These tubes are then fixed together, preferably by welding as indicated at 23 and 38. When the tubes 18, 19 and 20 are laid on the supporting surface in the manner just described, the sleeve members 21 and 22 are also laid alongside thereof as shown in Figure 5.

The next step in the manufacture of a lawn mower handle according to my invention, is to clamp the sleeves 21 and 22 about the tubes 18, 19 and 20. These sleeves may be spot welded to the tubes as indicated in the drawings. After the tubes and sleeves have been so assembled, I saw through the sleeve 21 along the dot-dash line indicated at 39 and through the sleeve 22 along the dot-dash line indicated at 40. I prefer that these sawing operations are performed simultaneously. Also, it will be observed that the sleeves 21 and 22 are so fastened to the tubes 18, 19 and 20 that when the sawing operation is completed, each of the severed sleeve portions is itself secured to these tubes.

Figure 7:
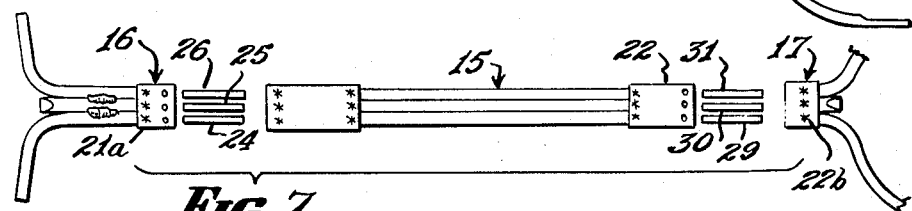

Upon completion of the sawing operation just described, it will be observed that there have now been formed the three basic sections 15, 16, and 17 above described. As seen in Figure 7 these three sections are next separated so that the sets of rods 24, 25, and 26 and 29, 30 and 31 may be inserted. As above mentioned, I prefer to insert one group of the rods into either the section 16 or the section 17 and to insert the other group of rods into one end of the section 15. In Figure 7 I have indicated that the rods 24, 25, and 26 will be inserted in the section 16 and the rods 29, 30 and 31 will be inserted in the section 15. In order to facilitate the fixing of these rods within the respective sections, I have indicated in Figure 7 that small holes may be drilled in the sleeves 21a and 22. Then, as shown in Figure 8, these rods may be spot welded through these holes into firm contact with the respective tubes and sleeves.

As above mentioned, I prefer to arrange the various rods of each group so that their outer ends are staggered with respect to each other. This may be accomplished by pushing the rods into the tubes by means of an instrument having offset steps so that the different rods are inserted to various depths (rods 29, 30 and 31), or rods of different lengths may be used and inserted to even depths (rods 24, 25 and 26).

Figure 8:
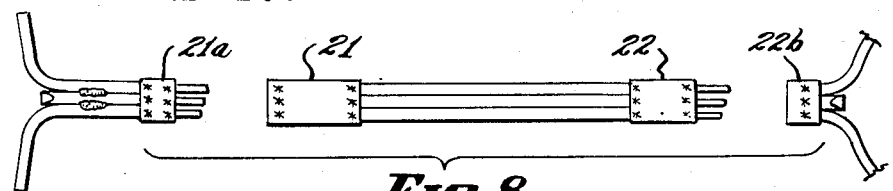
Figure 9:

After the rods have been fixed in the position indicated in Figure 8, the sections 15, 16 and 17 are assembled so that the sleeves 21 and 21a are flush with one another and the sleeves 22 and 22b are also flush with one another. Then, while maintained in clamped position, holes are drilled through the sleeves, tubes and rods as diagrammatically illustrated by the drills 41 and 42 in Figure 9. I prefer that the drills 41 and 42 be actuated simultaneously. After these holes are drilled, bolts 27 and 32 are immediately inserted in their respective hole and the nuts 28 and 33 fastened thereto.

Figure 10:
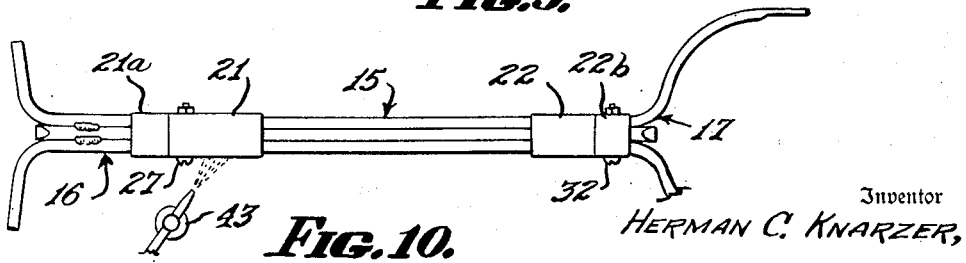

The lawn mower handle thus assembled is, as illustrated in Figure 10, then further processed as by painting. In Figure 10, I have indicated that this may be done by means of a spray or the like 43.

By this method of manufacturing my novel lawn mower handle, I have provided positive assurance that all the various sections will properly mate with one another and that a neat looking and rugged lawn mower handle will be obtained. The finished handle of Figure 10 may be stored until the manufacturer is ready to pack and ship the complete lawn mower. At this time the bolts 27 and 32 are removed and the sections 15, 16, and 17 taken apart and packed in the carton as above described. In this way the ultimate user is positively assured of obtaining a lawn mower handle of the proper size and which mates properly with the lawn mower.

Although it is not shown in the drawings, it is to be understood that rubber hand grips and the like may be provided for the ends of tube sections 18a and 20a. It will also be understood that the ends of the tube sections 18b and 20b are properly formed so as to be adapted in the usual manner to the wheel and blade assembly for which the handle is designed.

Although I have shown my novel lawn mower handle as embodied in specific structure, it is to be understood that I do not intend to be limited by such structure, excepting insofar as it is specifically set forth in the subjoined claims. It is also to be understood that modifications and changes both in my lawn mower handle and in my novel process for manufacturing same, can be made without departing from the scope and spirit of my invention, and, therefore, I do not intend to be limited otherwise than as is set forth in the subjoined claims as considered in the light of the specification and drawings presented herewith.

Having thus described my novel lawn mower handle and my novel process for manufacturing the same, what I claim as new and what I desire to protect by United States Letters Patent is:

1. A lawn mower handle comprising three sections, namely, a fork section, a central shank section, and a cross bar handle section, each of said sections comprising three tubes; a sleeve for each of said sections, each of said sleeves being fixed to the tubes of that section; and two groups of rods, one end of each of the rods of one group being fixed within one of the tubes of one of said three sections and adjacent one of the other of said three sections, and one end of each of the rods of the other group being fixed within one of the tubes of one of said three sections and adjacent one of the other of said three sections, the other end of each of the rods of each group protruding from the tube in which such rod is fixed and being adapted to fit within a tube of a said adjacent section, said sections being assembled with the said other ends of the rods of each group inserted within the tubes of that section adjacent the one to which the respective rods are fixed; each of said rods having holes bored therein near the said other ends thereof, the said adjacent sections having holes provided through the tubes thereof so as to align with said first mentioned holes when the said other ends of the rods are inserted in the tubes of said adjacent sections, and bolts to pass through said holes when aligned, whereby to fasten said sections together, said shank section being located between said fork section and said cross bar section.

2. The lawn mower handle of claim 1 in which the said other ends of each of the said groups of rods are staggered with respect to one another to facilitate the insertion of said rods within the said adjacent sections.

3. The lawn mower handle of claim 1 in which the ends of one group of rods are fixed within the tubes of said cross bar section, and in which the ends of the rods of said other group are fixed within the tubes of said central shank section.

4. The lawn mower handle of claim 1 in which the ends of one group of rods are fixed within the tubes of said fork section, and in which the ends of the rods of said other group are fixed within the tubes of said central shank section.

5. The lawn mower handle of claim 1 in which the ends of one group of rods are fixed within the tubes at one end of said central shank section, and in which the ends of the rods of said other group are fixed within the tubes at the other end of said central shank section.

6. The lawn mower handle of claim 1 in which the ends of one group of rods are fixed within the tubes of said fork section, and in which the ends of the rods of said other group are fixed within the tubes of said cross-bar section.

7. A tubular lawn mower handle consisting of three main sections and means for releasably connecting them together, the first of said sections being a fork section adapted to be fastened to a wheel-blade lawn mower assembly, the second of said sections being a straight-away shank portion, and the third section being a cross-bar section adapted to be gripped by one using the lawn mower; each of said sections comprising three tubes rigidly fixed together in side by side relationship; said fork section comprising a pair of relatively long outer tubes configured to be attached to said lawn mower assembly and a short central tube, said outer tubes and said central tube being bound together by a sleeve member adjacent those ends of said tubes removed from the lawn mower engaging ends; said straight-away shank portion comprising three straight tubes of equal length bound together by two sleeve members, one sleeve member being located adjacent one end of said tubes and the other of said sleeve members being located adjacent the other end of said tubes; said cross-bar section comprising a pair of outer tubes bent to form hand-grip portions and a relatively short, straight central tube, said outer tubes and said central tube being bound together by a sleeve member located adjacent the ends of said tubes removed from the hand-grip portions; said releasable connecting means comprising first means for releasably fastening the sleeve end of said fork section to one end of said shank portion and second means for releasably fastening the sleeve end of said cross-bar section to the other end of said shank portion.

8. The lawn mower handle of claim 7 in which each of said first and second means comprises a plurality of rods fixed within the ends of the tubes of one of said sections and adapted to fit within the ends of the tubes of an adjacent section, the free ends of said rods and holes in the tubes of said adjacent section being provided with openings, and a bolt adapted to be passed through said openings when aligned whereby adjacent sections are releasably fastened together.

9. The lawn mower handle of claim 8 in which the free ends of the rods of each set are staggered with respect to one another to facilitate the insertion of said rods within the said adjacent sections.

10. That process of manufacturing a tubular lawn mower handle of the type described which includes the steps of securing three tubes consisting of a pair of outer tubes, each of said outer tubes being shaped so as to provide a hand-grip portion and a lawn mower attaching portion, and a straight central tube; placing said three tubes in side by side relationship with said hand grip portions at one end and said mower attaching ends at the other end, said straight tube lying between said outer tubes; fastening a pair of sleeves about said three tubes, one sleeve being located adjacent the hand-grip portions and the other sleeve being located adjacent the mower attaching portions; severing each of said sleeves and the tubes about which each sleeve is fastened; whereby said three tubes are separated into three sections each consisting of a portion of each of said three tubes and bound together by at least one sleeve portion; inserting rods into at least two of the tubes of one section at the sleeve end thereof so that said rods protrude from said tubes and provide free ends which are adjacent the tubes of another section; inserting additional rods into at least two of the tubes of one section at the sleeve end thereof in the same manner as with said first mentioned rods so that the free ends of said additional rods are adjacent the ends of the tubes of an adjacent section, said last mentioned tube ends being free of obstruction; assembling said sections so that the free ends of the rods pass into the tubes of the adjacent sections and so that the severed sleeve portions abut one another in their original relationship; and drilling through the free ends of each set of rods and through the sleeve portion and tubes into which the free ends of each set of rods pass when said sections are moved together, whereby holes adapted to receive bolts for maintaining said sections together are provided.

11. The process of claim 10 which includes the step of welding said three tubes together before said sleeves are fastened thereto.

12. The process of claim 10 which includes the steps of inserting bolts into the holes formed; fastening nuts to said bolts; and painting said tubes, sleeves, bolts and nuts.

13. A lawn mower handle comprising a fork section, a shank section, and a handle section, each of said sections comprising at least two tubes, the tubes of said shank section being secured together in parallel relationship, and the tubes of said fork and handle sections being secured together in parallel relationship for at least a part of their length, studs of a size to fit snugly in the ends of said tubes and constituting male joining elements, there being at least two of said studs secured in the tubes at one end of said shank section so as to have a substantial portion of these studs projecting from said shank section, and there being at least two of said studs secured in the tubes at the joining end of one of said other sections so as to have a substantial portion of these studs projecting from such other section, said shank section having studs secured in the tubes at said one end only, the tubes of the adjacent section constituting female joining elements at each joint, whereby said sections can be assembled in only one orientation, said female joining elements and said male joining elements being provided openings, and bolts passing through said openings when aligned to fasten said sections together releasably.

14. A lawn mower handle comprising three sections, namely, a fork section, a shank section, and a handle section, each of said sections comprising at least two tubes, the tubes of said shank section being secured together in parallel relationship, and the tubes of said fork and handle sections being secured together in parallel relationship for at least a part of their length; studs of a size to fit snugly in the ends of said tubes and constituting male joining elements, there being at least two of said studs secured in the tubes of one of said three sections adjacent the ends of the tubes of another of said three sections, and there being at least two additional of said studs secured in the tubes of one of said three sections adjacent the ends of the tubes of another of said three sections, each of the secured studs having a substantial portion thereof projecting from the tube in which it is secured, the ends of the tubes of a section adjacent the ends of the tubes of a section in which studs are secured constituting female joining elements, the said projecting portions of the studs being adapted to fit within the said female elements adjacent thereto, the said three sections being assembled with the projecting portion of each stud inserted within a female element of that section adjacent the section in which each said stud is secured, whereby said three sections can be assembled in only one orientation; said female joining elements and said projecting stud portions being provided openings, and bolts passing through said openings when aligned to fasten said sections together releasably.

HERMAN C. KNARZER.

References Cited in the file of this patent

UNITED STATES PATENTS

| Number | Name | Date |
|---|---|---|
| 2,281,923 | Davis | May 5, 1942 |
| 2,511,160 | Grobowski | June 13, 1950 |